INVENTOR.
WALTER M. TEMPLIN

July 17, 1962 W. M. TEMPLIN 3,044,490
AUTOMATIC PILOT
Filed April 14, 1958 5 Sheets-Sheet 2

INVENTOR.
WALTER M. TEMPLIN
BY
ATTORNEYS

July 17, 1962

W. M. TEMPLIN 3,044,490

AUTOMATIC PILOT

Filed April 14, 1958

INVENTOR.
WALTER M. TEMPLIN
BY

ATTORNEYS

July 17, 1962 W. M. TEMPLIN 3,044,490
AUTOMATIC PILOT
Filed April 14, 1958 5 Sheets-Sheet 4

INVENTOR.
WALTER M. TEMPLIN
BY
ATTORNEYS

July 17, 1962 W. M. TEMPLIN 3,044,490
AUTOMATIC PILOT
Filed April 14, 1958 5 Sheets-Sheet 5

INVENTOR.
WALTER M. TEMPLIN
BY
ATTORNEYS

United States Patent Office 3,044,490
Patented July 17, 1962

3,044,490
AUTOMATIC PILOT
Walter M. Templin, Wayne, Pa., assignor to Aircraft Products Co., Bridgeport, Pa., a corporation of Pennsylvania
Filed Apr. 14, 1958, Ser. No. 728,151
7 Claims. (Cl. 137—622)

This invention relates to automatic pilots and more particularly to automatic pilots for dirigible craft based on pneumatic signal control and pneumatic power output.

In the co-pending application, Serial No. 728,158 filed April 14, 1958, there is disclosed a complete automatic pilot system based on pneumatic sensing, amplifying and power circuits. As part of a complete automatic pilot system of this type, it is necessary to provide various control functions which are accessible to the pilot. For example, it is necessary to provide for control of the vacuum source, normally derived from the engines of the aircraft, to energize the sensing instruments such as the gyroscopes and to energize the amplifying and power output circuits which drive the control surfaces of the aircraft. It is also necessary to provide manual control means whereby the pilot can override the sensing instruments and introduce his own command controls.

Accordingly, it is one object of the invention to provide improved pneumatic control means for use in automatic pilots.

Another object of the invention is to provide manually operative control units whereby the pilot of an aircraft can pilot the craft by the use of a pneumatic power system to drive the control surfaces.

Another object of the invention is to provide improved, remotely controlled, shut-off valves for use in automatic pilot systems of the pneumatic type.

Still another object of the invention is to provide a command control unit for automatic pilots which automatically shuts off the signals from the directional gyroscope at such times as the pilot elects to control the aircraft through manually introduced error signals.

The above and other features of the present invention will be apparent to those skilled in the art by having reference to the following specification taken in conjunction with the accompanying drawings; in which.

Figure 1:
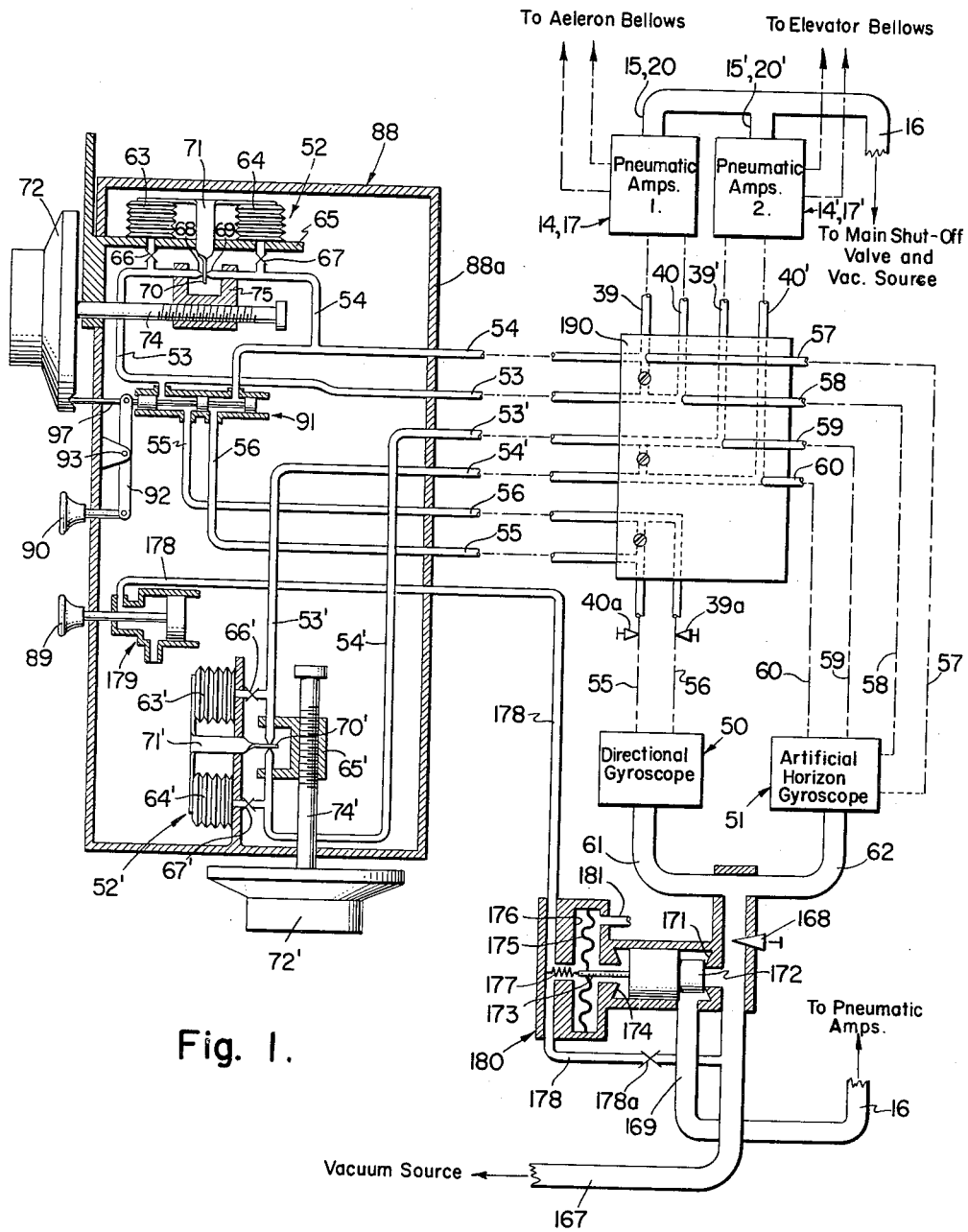
FIGURE 1 is a layout diagram, essentially schematic in nature, of a control assembly for a pneumatic automatic pilot system.

Referring first to FIGURE 1 the present invention is illustrated as embodied in a pneumatic automatic pilot system. The full details of a complete automatic pilot system are disclosed in the co-pending application, Serial No. 728,158, filed April 14, 1958, and need not be duplicated herein. Briefly, the system includes a directional gyroscope 50 and an artificial horizon sensing units or instruments taking the form, for example, of a directional gyroscope 51 which furnish, in accordance with well known techniques, pneumatic signals which, after amplification by suitable pneumatic amplifiers 14, 17 and 14', 17', drive aileron and elevator actuating motors, preferably taking the form of bellows. The present invention is concerned particularly with control portion of the automatic pilot by means of which the various pneumatic components are connected to a source of pneumatic energy; control signals from the directional gyroscope are selectively utilized; and signals are generated manually by the pilot and introduced into the system to effect manual control of the aircraft through the pneumatic power system of the automatic pilot.

To this end, the illustrated portion of the automatic pilot includes a manual input control in the form of a command control unit 88 (also seen in FIGURE 2) normally located in the aircraft at a point conveniently accessible to the pilot and a pneumatic power shut-off valve 180 normally located at a remote point but actuated from the command control unit in a manner to be described.

The command control unit 88 has mounted therein a turn command control unit indicated generally by the numeral 52 and a pitch command control unit indicated generally by the numeral 52'. The command control unit also includes a master pneumatic or pilot valve control 89 for the power valve unit 180 and a heading set control 90, the latter being interconnected with the turn command control unit 52. The turn command control unit 52 and the pitch command control unit 52' are substantially identical and only one unit is, therefore, described in detail below, like parts of the duplicate unit being identified by like primed reference numerals. The turn command control unit 52 is connected, via a cut-out valve 91 (actuated by the heading set control 90), in shunt across a pair of pneumatic conduits 55 and 56 which carry pneumatic signals from the directional gyroscope 50 representative of deviations from desired headings. Conduits 53 and 54 and conduits 39 and 40 (meeting in a junction box 190) lead to the pneumatic amplifiers 14, 17 which drive motors connected to the control surfaces of the aircraft. Pneumatic signals from the artificial horizon gyroscope are introduced into this conduit system by the conduits 57 and 58, and, therefore, are also shunted by the turn command control unit 52. When the cut-off valve is open the conduit 55, which includes the restriction 40a, is connected from the directional gyroscope to the conduit 54 (through valve 91). The conduit 54 is connected to the conduit 57 from the artificial horizon and both are connected to the output conduit 39; similarly the conduit 56 (including a restriction 39a) is connected through the valve 91 to the conduit 53 which, together with the conduit 58, from the artificial horizon gyroscope 51, is connected to the conduit 40. In this fashion the turn command control unit, which is coupled to the conduits 53 and 54, is capable of attenuating signals from both the directional and artificial horizon gyroscope.

Figure 5:
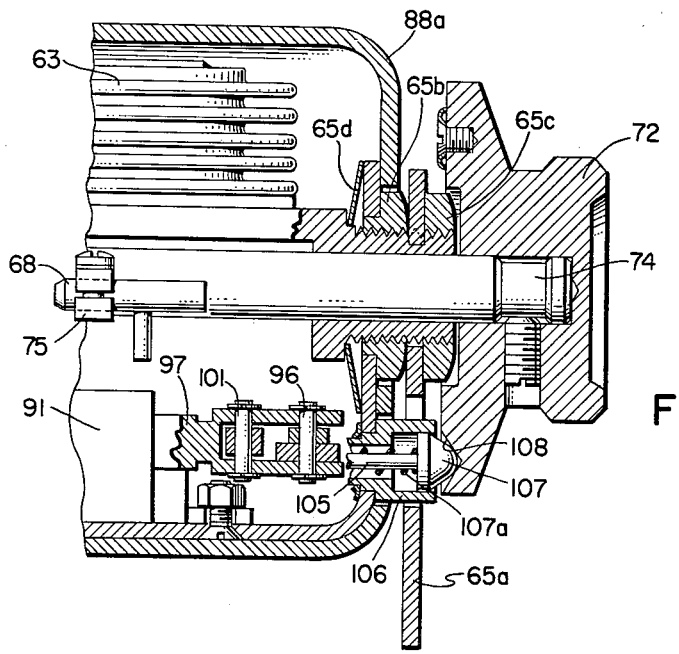
FIGURE 5 is a view in vertical section of FIGURE 3.
Figure 6:
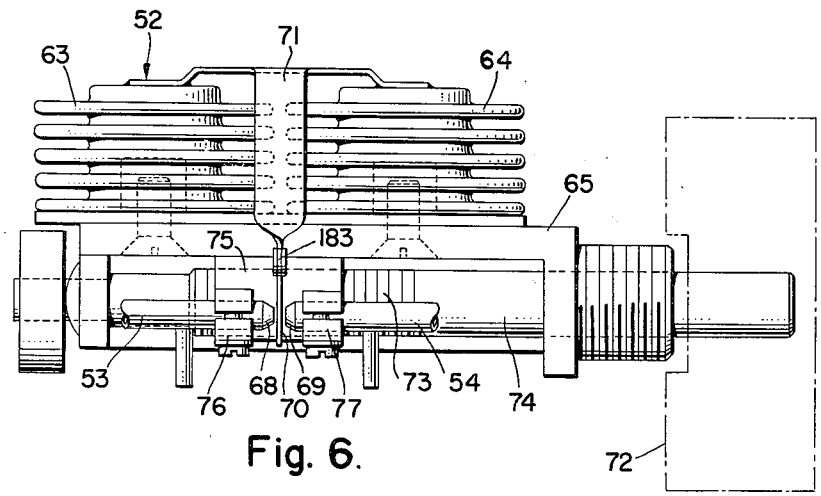
FIGURE 6 is a view in side elevation of a sub-assembly from the unit of FIGURES 1–5.
Figure 7:
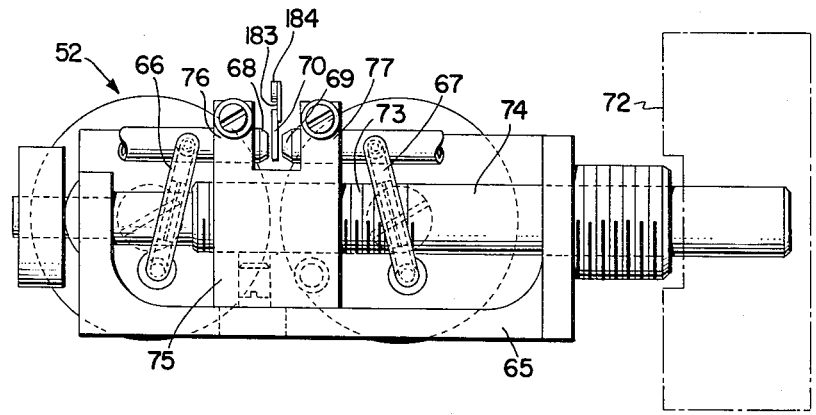
FIGURE 7 is a bottom view of the sub-assembly of FIGURE 6.

The turn command control unit 52, shown diagrammatically in FIGURE 1 and structural details of which are illustrated in FIGURES 5, 6, and 7, includes a pair of bellows 63 and 64 supported on a common frame or base 65 and coupled respectively to the conduits 53 and 54 by means of constriction conduits 66 and 67 for rate control. The conduits 53 and 54 terminate in constriction nozzles or orifices 68 and 69 which vent to the atmosphere. Between the opposed nozzles 68 and 69 is a flapper 70 rigidly supported by a T-shaped bracket assembly 71, the arms of which are respectively secured to the moving ends of the bellows 63 and 64. A change in the relative pneumatic pressures in the bellows will, therefore, cause the flapper 70 to move toward one or the other constriction nozzles 68 and 69 to change the relative air flow into the two nozzles.

Command controls, as opposed to signals from the gyroscope units, are introduced into the turn command control unit 52 by means of a command knob 72 which changes the relative spacing between the flapper 70 and the nozzles 68 and 69. This action is effected by shifting the two nozzles axially under the control of a lead screw 73 on the shaft 74 to which the knob 72 is attached. The shaft 74 is secured against axial movement, and its lead screw 73 drives a threaded block or common support member 75 to which the two nozzles 68 and 69 are secured by clamps 76 and 77, respectively. Turning the knob 72, therefore, enlarges the distance between one of the nozzles and the flapper, while correspondingly decreasing the distance between the other nozzle and the flapper. The conduits 66 and 67 are adapted to yield with this motion, which is extremely small. It will be observed that the flapper 70 through its one-piece, T-shaped support bracket 71, is coupled directly to the working ends of the bellows 63 and 64. The pivot axis of the flapper 70 in response to differential movement of the two bellows, is therefore, not captive, and the two bellows, when moving as one in response to variations in the vacuum source, will be free to move without reacting against constraining linkage and without introducing error signals into the control system.

Figure 2:
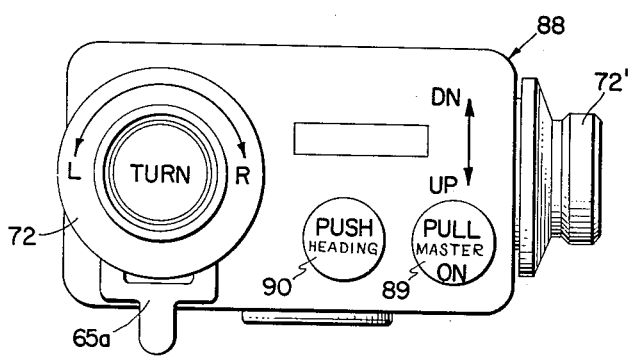
FIGURE 2 is a view in front elevation of a typical control unit embodying the present invention.

As best seen in FIGURES 1, 2, and 5 trim adjustments can be made by shifting the frame 65, together with the bellows 63 and 64 and the flapper 70, axially of the nozzles 68 and 69. To this end the frame 65 is arranged to be rotated on the lead screw through extremely small angles while the lead screw is held against rotation. A trim control lever 65a is keyed to the frame 65 to turn therewith and the frame and lever are frictionally held against rotation relatively to the casing 88a by means of friction washers 65b and 65c (FIGURE 5), spring loaded by a spring washer 65d. This friction force normally holds the frame 65 against rotation when the lead screw 74 is rotated by the command turn control knob 72. When, however, it is desired to introduce extremely small compensating adjustments, the lever 65a is turned to turn the frame 65 and the common support member 75 on the immobilized lead screw 74. This shifts the nozzles 68 and 69, depending on the direction of rotation, so that one is moved closer to the flapper 70 and the other away therefrom. The lead screw is held against rotation at this time by a detent 107 which engages a shallow recess 108 in the knob 72. This detent mechanism, which will be described at greater length below in connection with the description of the cut-off valve 91, holds the knob and lead screw releasably in a central or "no-signal" position. In the event, the trim compensation by the lever 65a is inadequate to bring the system into equilibrium, the knob 72 can be freed from the lead screw (by a suitable setscrew holder, not shown) and the lead screw rotated to achieve approximate equilibrium, at which time the knob is secured to the lead screw with the knob engaged of course by the detent 107.

The response of the automatic pilot to correct an error will vary with the magnitude of the error signal. It will be observed that the command control unit 52 is connected in parallel with the directional gyroscope and with the bank portion of the artificial horizon by the conduits 53 and 54. Initially, the error signal from the gyroscope pick-offs bypass the conduits 53 and 54 and impress themselves directly on the pneumatic amplifiers 14, 17 and 14', 17'. The rate of response is controlled, however, by the action of the rate bellows 63 and 64 in the command control unit 52. A slow error signal in the form, for example, of a higher vacuum in the conduit 40 than in the conduit 39 will cause the bellows 63 to contract while the bellows 64 expands, the pressures effecting this motion being introduced to the bellows through the constrictions 66 and 67. As a result, the flapper 70 is driven to the right, as viewed in FIGURES 4 and 6 to tend to close off the atmospheric bleed into the conduit 39 via the constricted orifice 69 of the conduit 54 and to increase the atmospheric bleed to the conduit 40 (presently under higher vacuum) via the constricted nozzle 68 of the conduit 53. The result is controlled attenuation of the original error signal. A fast signal change will momentarily bypass the bellows 63 and 64, this being a function of the time constants of the constrictions 66 and 67, to impose the necessary rapid and forceful compensations on the control surfaces of the aircraft. In this fashion, the servo response is given a phase lead over the actual aircraft displacement. The transient signal components also oppose any tendencies of the system to overshoot the desired correction.

Similarly to the turn error action described above, an error signal from the artificial horizon gyroscope will cause a larger proportion of the vacuum to be introduced into the conduit 58. A pressure differential will occur in the conduits 58 and 57, therefore, which introduces an error signal in the form of decreased pressure in the conduit 40 and increased pressure in the conduit 39. Following the same chain of actions as described above, a correcting motion will be imparted to the ailerons to roll the airplane to the right to correct the error roll to the left. Similarly the unit 52' will be actuated when the plane goes into a dive or a climb or when a pitch command is manually introduced, as described below.

Figure 3:
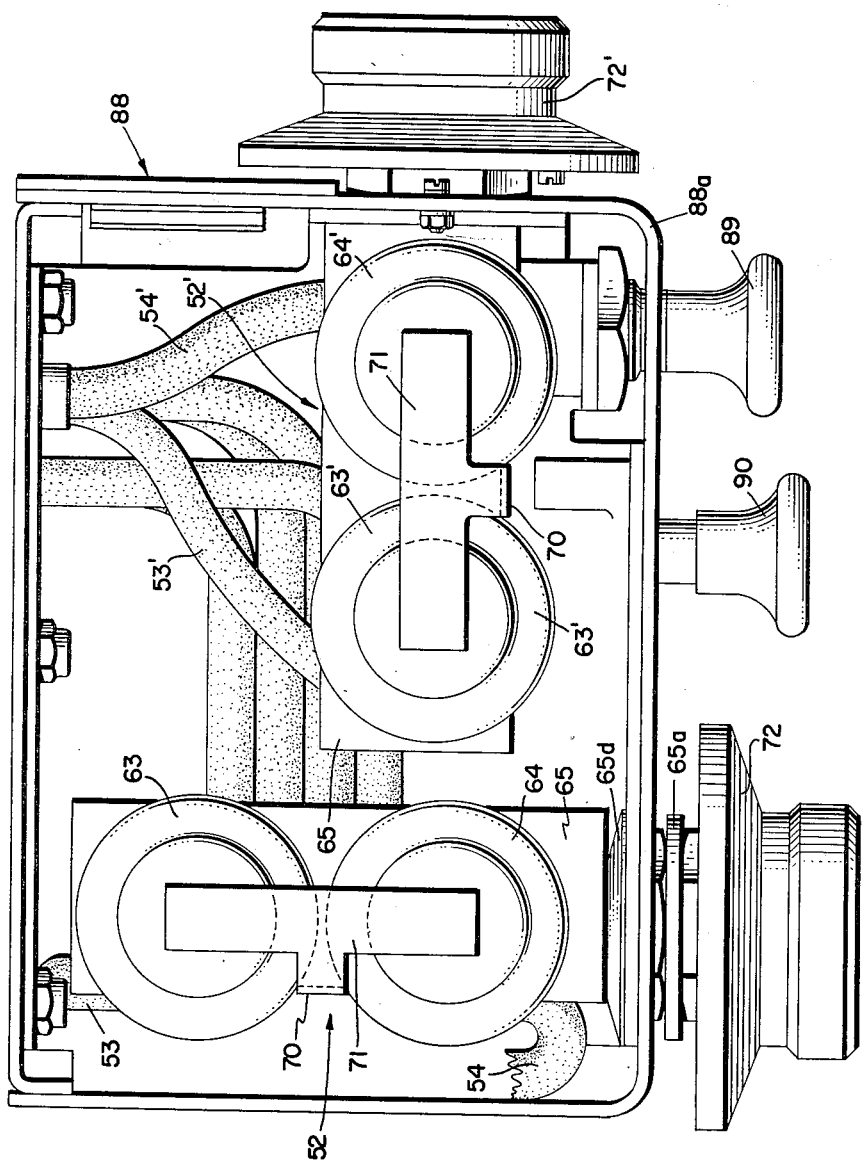
FIGURE 3 is a plan view in enlarged scale, with the top cover removed, of the unit of FIGURE 2.

As thus far described, error signals and command fixed heading signals operate the automatic pilot. The system is also capable of command control under the finger tip manipulation of the pilot through the command control units 52 and 52'. FIGURE 3 is a top view of the complete command control assembly, identified generally by the reference numeral 88. This assembly includes, aligned on different axes, the turn command control unit 52 and the pitch command control unit 52'. The units 52 and 52', one of which is illustrated in detail by FIGURES 6 and 7, are substantially the same. Turn control is effected through the finger knob 72, preferably arranged in the airplane so that it faces the pilot to be rotated right or left from a neutral, central position.

Also included in the housing 88 is, as stated above, a master control knob 89 and a heading set knob 90 which controls a valve 91 through which the error signals of the directional gyroscope are coupled to the automatic pilot, this valve being interposed in the conduits 55 and 56 to cut the directional gyroscope in and out of the system. Depressing the knob 90 serves to open the valve 91 to cut the directional gyroscope into the system. However, when the pilot undertakes to maneuver the airplane through a command turn by means of the control knob 72, it is necessary that the directional gyroscope be cut out of the system so that there will be no error signal to adversely affect the turn. In accordance with the present invention, therefore, the directional gyroscope is automatically removed from the system when the knob 72 is manipulated.

Figure 4:
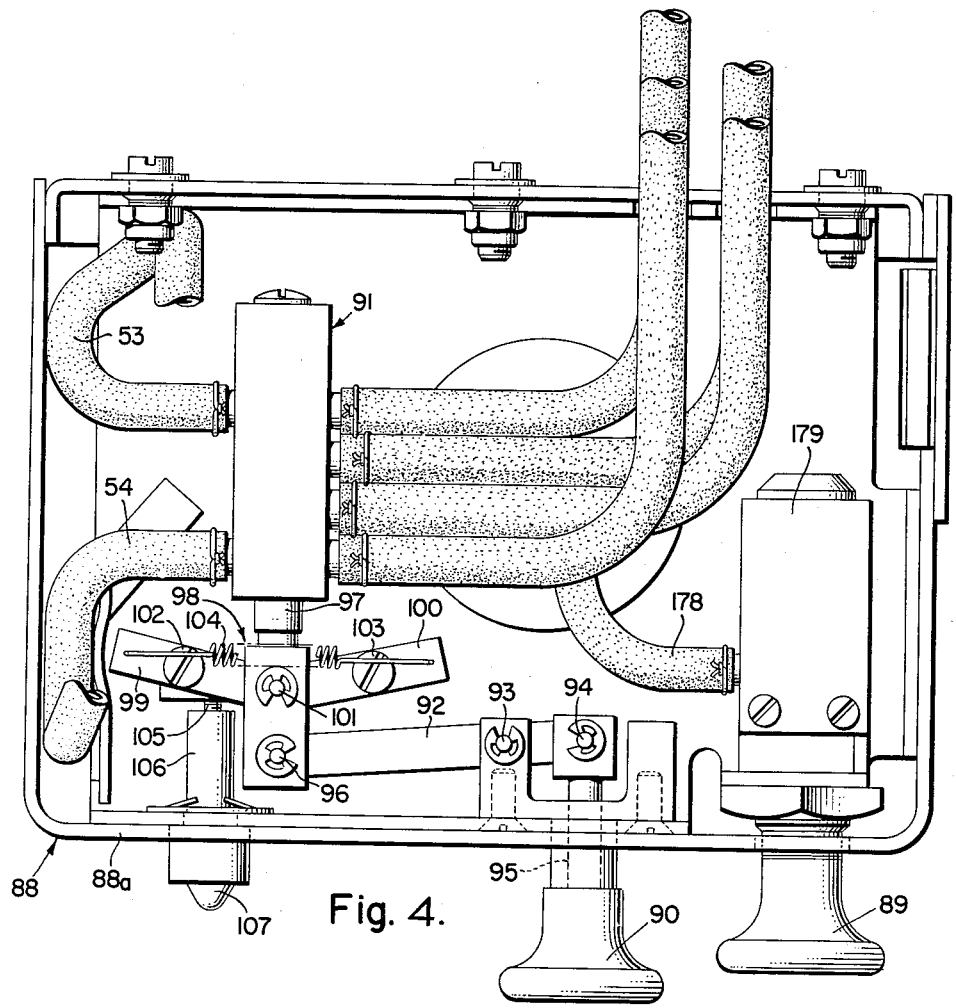
FIGURE 4 is a view in transverse section of FIGURE 2.

To this end, as best seen at FIGURE 4, a coupling is provided between the knob 90 and the valve 91 including a rocker arm 92 pivoted to the casing 88a at 93 and having its right-hand end pivotally connected at 94 to a push shaft 95 (to which the knob 90 is affixed) and having its other end coupled in a pivotal connection 96 to a valve actuating shaft or stem 97. The valve stem 97 is held, releasably, in its full open or full closed positions by means of an overcentering toggle indicated generally by the numeral 98. The overcentering toggle includes a pair of articulated links 99 and 100, the common or center pin 101 of which is pinned to the valve shaft 97. The links 99 and 100 are pivoted to the frame at 102 and 103 respectively and a tension spring 104 reacts between extensions of their outer ends. As best seen at FIGURE 5, a push shaft 105 is slidably received in a bushing 106 carried by the casing, the shaft 105 terminating at its outer end in the detent 107 and at its inner end against the link 99 at a point spaced inwardly of its pivot 102.

The detent 107 is urged outwardly by a spring 107a. The detent 107 is received in a recess 108 formed in the inner face of the knob 72, the recess being so disposed that the knob is in its neutral or no-command position when the detent is received therein.

In operation of the autopilot, assuming the knob 90 has been depressed and the aircraft is operating automatically under the control of the directional gyroscope and the artificial horizon, attention by the pilot is normally not required. In certain cases, however, it is essential or desirable that the pilot introduce his own command signals through the automatic pilot power system. In such case, the pilot turns the control knob 72 either to the right or to the left, depending on the direction of turn required, whereupon the knob drives the detent 107 inwardly to cause the push shaft 105 to drive the articulated links 99 and 100 of the toggle inwardly to overcenter the toggle and drive the valve stem 97 inwardly to close the valve 91 to cut off the conduits 55 and 56 carrying the error signals from the directional gyroscope 50. The valve 91 is shown diagrammatically in FIGURE 1. The aircraft is now under the control of the pilot and will perform such maneuvers as he might command. To re-engage the directional gyroscope, the pilot returns the knob 72 to its central or neutral position and depresses the knob 90 to open the valve 91 to re-engage the directional gyroscope at the same time the toggle is overcentered. If the aircraft is at this time not on the heading which has been preset in the directional gyroscope, the automatic pilot will promptly return it to that heading, even though the aircraft might be as much as 90° off course. The toggle can not be overcentered unless the knob 72 is in its neutral or "no-command" position. Also, the toggle will hold the valve 91 either fully open or fully closed at all times.

The automatic cutout of the heading setting from the directional gyroscope enables the pilot to negotiate a turn through any desired angle without precessing the gyroscope or otherwise compensating for the error signal generated thereby. In the case of the artificial horizon which produces signals in response to pitch and roll, a cutout of the error signals is not required. This is due to the fact that a pitch and roll are brought about by a transient or momentary movement of the control surfaces, the control surfaces becoming streamlined immediately after the desired bank, climb or dive angle has been attained. The controls having become streamlined, no further change in direction of the aircraft occurs, and it is possible to balance the roll and pitch error signals from the artificial horizon 51 by a fixed setting of the command control in the command control unit 52'.

Figure 9:
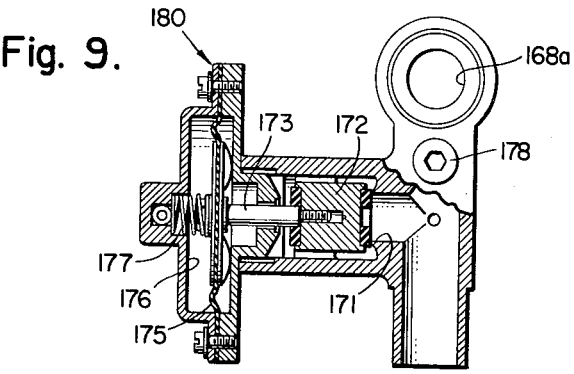
FIGURE 9 is a view partly in transverse section of the main shut-off valve illustrated schematically in FIGURE 1.

Referring to FIGURES 1 and 9, there is illustrated a main shut-off valve assembly 180 for controlling the pneumatic supply to the gyroscopes and to the automatic pilot. The valve assembly includes a vacuum inlet conduit 167 adapted to be connected to the ship's supply and a first pair of outlet conduits 168a and 168b respectively comprising the suction conduits to the gyroscopes 50 and 51. A valve 168c is provided to control the flow. Other valves (not shown) at the gyroscope units are used to start and stop the gyroscope. A T-connection from the main supply conduit 167 terminates in a valve seat 171 against which a valve element 172 rests. An output conduit 169 leading to the pneumatic amplifiers of the automatic pilot is thereby sealed off from the vacuum source. A valve stem 173 is coupled through a second valve seat 174 to the center of a diaphragm 175 mounted in a closed chamber 176 and a coil spring 177 urges the diaphragm and valve element 172 toward the valve seat 171. Normally, the suction in the conduit 167 cooperates in holding the valve element 172 on its seat. Forces to move the valve element 172 from its seat 171 are provided by a small shunt conduit 178 tapped into supply conduit 167 and coupled to the left hand side of the chamber 176 as viewed in the drawing. The conduit 178 includes a constriction 178a. The conduit 178 extends from the remote location of the valve assembly 180 to the command control unit 88, normally located on the panel board before the pilot. The conduit 178 terminates in the unit 88 in a valve unit 179 which is actuated by the finger knob 89.

The valve 179 is a control valve unit which selectively vents the conduit 178 to atmosphere or seals it from the atmosphere under the control of the finger knob 89. When the valve 179 is venting to the atmosphere, as shown in FIGURE 1, atmospheric pressure will be impressed on the left hand side of the diaphragm 175 of the power valve assembly 180 and the combination of the pressure of the spring 177 (FIGURE 9) and the suction in conduit 167 holds the valve element 172 on its seat 171. The relatively small leakage through the constriction 178 will not significantly influence the pressure on the diaphragm. To open the valve 180, thereby energizing the pneumatic amplifiers 14, 17 and 14', 17', the pilot actuates the knob 89 to seal off the conduit 178 from atmosphere. Immediately a vacuum begins building in the chamber 176 through the constriction 178a and the diaphragm, which is relatively large in area, pulls the valve element 172 from its seat to expose the pneumatic amplifiers to the vacuum source of the conduit 167. The valve element preferably back seats against the second seat 174 to prevent leakage via an atmospheric vent 181 on the right hand side of the diaphragm. The valve remains in this status until the pilot presses the knob 89 to vent the conduit 178 to atmosphere to reduce the holding vacuum on the diaphragm to allow the spring 177 to urge the element 172 against its first seat 171. In this fashion the power valve is actuated remotely through a completely pneumatic system.

Figure 8:
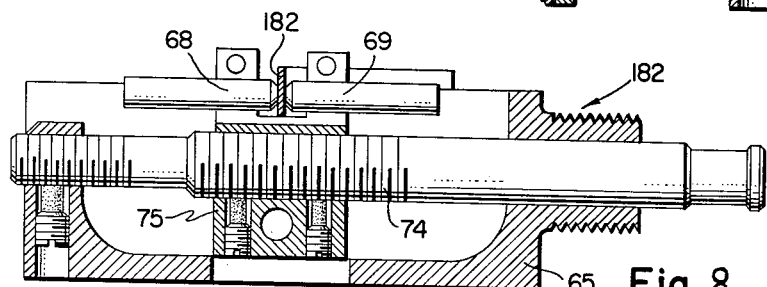
FIGURE 8 is a view in side elevation of a simplified arrangement for the sub-assembly of FIGURES 6 and 7 in which the signal-attenuating rate function has been eliminated from the system.

While the invention has been described above having specific reference to the illustrated preferred embodiment thereof, it will be understood that various changes and modifications can be made in the system and the several component parts thereof. Thus, for example, if it is desired to provide a system in which the rate function introduced by the bellows 63 and 64 in the command control is not provided, control units in accordance with the arrangement of FIGURE 8 can be used. This unit, identified generally by the numeral 182, is substituted directed for the unit 52 (or 52'). The unit 182, in which parts corresponding directly to those of the unit 52 are identified by like, primed reference numerals, includes a lead screw 74' which, when turned, as by a knob 72, drives a threaded block 75' to and fro. The block 75' carries the opposed pneumatic nozzles 68' and 69' in inverse motion relatively to the flapper 183 (corresponding to the flapper 70 of the unit 52). The flapper 183 is, however, fixed to the frame 65' and does not move as a function of change of signal pressure in the control system.

Other modifications and changes in the automatic pilot will suggest themselves to those skilled in the art having reference to this specification. The invention should not, therefore, be regarded as limited except as defined in the following claims.

I claim:

1. In a pneumatic control for automatic pilots or the like; pneumatic conduit means to carry variable pneumatic pressures representative of a control function; deformable means responsive to pressure variations in the conduit means; a pneumatic orifice connected to said conduit means, a valve flapper movably connected to said deformable means to move toward and away from the pneumatic orifice control adjusting means for the pneumatic orifice, a lead screw to shift the support, and a first manual control member to turn the lead screw, thereby to move the orifice means in translation to change the spacing between the orifice means and the flapper; and a second manual control member to turn the moveable support about the lead screw in small amounts to introduce corrections into the system.

2. Apparatus as set forth in claim 1, including a frame to carry the lead screw and the moveable support, means including a friction coupling to mount the moveable support for rotation on the lead screw and relatively to the frame, and releasable holding means to hold the first control member and the lead screw against rotation relatively to the frame.

3. In a pneumatic control for automatic pilots or the like for manually introducing pneumatic control signals into the system, a pair of pneumatic bellows moveable in response to pressure differentials impressed and across, a pair of pnuematic conduits to carry pneumatic pressures which are variable relatively to each other to represent control signals, said conduits being respectively connected to differentially deform said bellows, a pair of axially opposed, spaced-apart pneumatic orifices connected respectively to said conduits, a valve flapper between the orifices and connected to the two bellows to move therewith back and forth between the orifices, a common support for the two orifices, and manual control means to shift the common support in directions axial with respect to the pneumatic flow therein.

4. Apparatus as set forth in claim 3, said manual control means comprising a lead screw to drive the common support member, and a manual control member coupled to said lead screw.

5. Apparatus as set forth in claim 4, including a fixed casing and a frame, means to mount the common support member in the frame, releasable holding means to hold the lead screw against rotation relatively to the fixed casing, and a second manual control member coupled to the frame, whereby small, adjusting movements about the lead screw can be made by turning the frame on the lead screw and whereby the first manual control member can be operated to turn the lead screw.

6. Apparatus as set forth in claim 5, including friction means between the frame and the casing to releasably hold the frame against rotation relatively to the casing, said releasable holding means between the lead screw and the casing comprising a detent between the first control member and the casing.

7. Apparatus as set forth in claim 6, said bellows, pneumatic orifices, flapper, and common frame being mounted to turn as one with the second control member about the lead screw, whereby when the second control member is actuated the common support and orifices are shifted in translation axially of the lead screw as well in rotary motion about the axis of the lead screw, while the flapper moves only in rotation about the lead screw.

References Cited in the file of this patent

UNITED STATES PATENTS

| | | |
|---|---|---|
| 2,180,320 | Hansen | Nov. 14, 1939 |
| 2,373,315 | Kenyon | Apr. 10, 1945 |
| 2,442,116 | Carlson | May 25, 1948 |
| 2,445,335 | Philbrick et al. | July 20, 1948 |
| 2,477,897 | Ray | Aug. 2, 1949 |
| 2,539,131 | Gunderson | Jan. 23, 1951 |
| 2,577,967 | Hughes | Dec. 11, 1951 |
| 2,593,129 | Fischer | Apr. 15, 1952 |
| 2,611,560 | Harcum et al. | Sept. 23, 1952 |
| 2,630,132 | Hughes | Mar. 3, 1953 |
| 2,652,066 | Bowditch | Sept. 15, 1953 |
| 2,678,177 | Chenery et al. | May 11, 1954 |
| 2,776,669 | Gorrie | Jan. 8, 1957 |
| 2,790,427 | Carson | Apr. 30, 1957 |
| 2,834,362 | Gorrie et al. | May 13, 1958 |

FOREIGN PATENTS

| | | |
|---|---|---|
| 893,211 | France | Jan. 24, 1944 |
| 900,424 | France | Oct. 2, 1944 |
| 831,161 | Germany | Feb. 11, 1952 |
| 668,006 | Great Britain | Mar. 12, 1952 |